(12) United States Patent
Grigorov et al.

(10) Patent No.: US 12,045,659 B2
(45) Date of Patent: Jul. 23, 2024

(54) EFFICIENTLY MAINTAINING A GLOBALLY UNIFORM-IN-TIME EXECUTION SCHEDULE FOR A DYNAMICALLY CHANGING SET OF PERIODIC WORKLOAD INSTANCES

(71) Applicant: VMware LLC, Palo Alto, CA (US)

(72) Inventors: Danail Metodiev Grigorov, Sofia (BG); Nikolay Kolev Georgiev, Sofia (BG)

(73) Assignee: VMware LLC, Palo Alto, CA (US)

( * ) Notice: Subject to any disclaimer, the term of this patent is extended or adjusted under 35 U.S.C. 154(b) by 342 days.

(21) Appl. No.: 17/373,476

(22) Filed: Jul. 12, 2021

(65) Prior Publication Data

US 2023/0020580 A1    Jan. 19, 2023

(51) Int. Cl.
*G06F 9/50*  (2006.01)
*G06F 9/48*  (2006.01)

(52) U.S. Cl.
CPC ......... *G06F 9/5038* (2013.01); *G06F 9/4881* (2013.01); *G06F 9/505* (2013.01); *G06F 9/5083* (2013.01)

(58) Field of Classification Search
CPC ...... G06F 1/329; G06F 9/4843; G06F 9/4887; G06F 9/505; G06F 9/5083
See application file for complete search history.

(56) References Cited

U.S. PATENT DOCUMENTS 11,726,817 B2 *   8/2023   Floyd ................... G06F 9/5038
                                                    718/102

* cited by examiner

*Primary Examiner* — Andy Ho
(74) *Attorney, Agent, or Firm* — Quarles & Brady LLP (57) ABSTRACT

An algorithm for efficiently maintaining a globally uniform-in-time execution schedule for a dynamically changing set of periodic workload instances is provided. At a high level, the algorithm operates by gradually adjusting execution start times in the schedule until they converge to a globally uniform state. In certain embodiments, the algorithm exhibits the property of "quick convergence," which means that regardless of the number of periodic workload instances added or removed, the execution start times for all workload instances in the schedule will typically converge to a globally uniform state within a single cycle length from the time of the addition/removal event(s) (subject to a tunable "aggressiveness" parameter).

21 Claims, 4 Drawing Sheets

EFFICIENTLY MAINTAINING A GLOBALLY UNIFORM-IN-TIME EXECUTION SCHEDULE FOR A DYNAMICALLY CHANGING SET OF PERIODIC WORKLOAD INSTANCES

BACKGROUND

Unless otherwise indicated, the subject matter described in this section is not prior art to the claims of the present application and is not admitted as being prior art by inclusion in this section.

In computing, the need to execute multiple instances of a periodic (i.e., recurring) workload with respect to different targets is fairly common. For example, consider an "up-time check" service that monitors the health status of a group of servers by polling each server once an hour. In this example, the hourly polling operation is the periodic workload and the polling of each server (i.e., target) in the group of servers is an instance of that periodic workload.

For various reasons, it often is useful to execute such periodic workload instances according to a globally uniform-in-time schedule. If the number of periodic workload instances is predetermined, this schedule is static in nature and can be easily calculated in advance. However, if the number of periodic workload instances may change during runtime, this schedule must be adjusted on-the-fly as instances are added and removed in order to maintain global uniformity, which is a complex task.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

The present disclosure is directed to an algorithm for efficiently creating and maintaining a globally uniform-in-time execution schedule for a dynamically changing set of periodic workload instances. As used herein, a "periodic workload instance" is an instance of a workload that is configured to run on a periodic basis (e.g., at least once every c units of time). The value c is referred to as the cycle length of the workload. A "globally uniform-in-time execution schedule" for a set of periodic workload instances is a schedule that defines a sequence of execution start times for those workload instances, with the constraints that (1) consecutive execution start times for the same periodic workload instance are separated by cycle length c, and (2) adjacent execution start times—whether they apply to the same or different periodic workload instances—are separated by a uniform time interval $t \le c$. If the total number of periodic workload instances is m, t can be computed as c/m.

At a high level, the algorithm of the present disclosure maintains a globally uniform-in-time execution schedule in the face of dynamic workload instance changes by gradually adjusting the execution start times in the schedule until they converge to a globally uniform state (i.e., a state that conforms to constraints (1) and (2) above). This approach avoids the inefficiencies and potential scheduling irregularities arising out of recreating the schedule in its entirety for each batch of workload instance addition(s)/removal(s).

In addition, the algorithm of the present disclosure exhibits the property of "quick convergence," which means that regardless of the number of periodic workload instances added or removed, the execution start times for all workload instances in the schedule will typically converge to a globally uniform state within a single cycle length from the time of the addition/removal event(s) (subject to a tunable "aggressiveness" parameter). These and other aspects are described in further detail in the sections below.

2. Example Computing Environment and Solution Description

Figure 1:
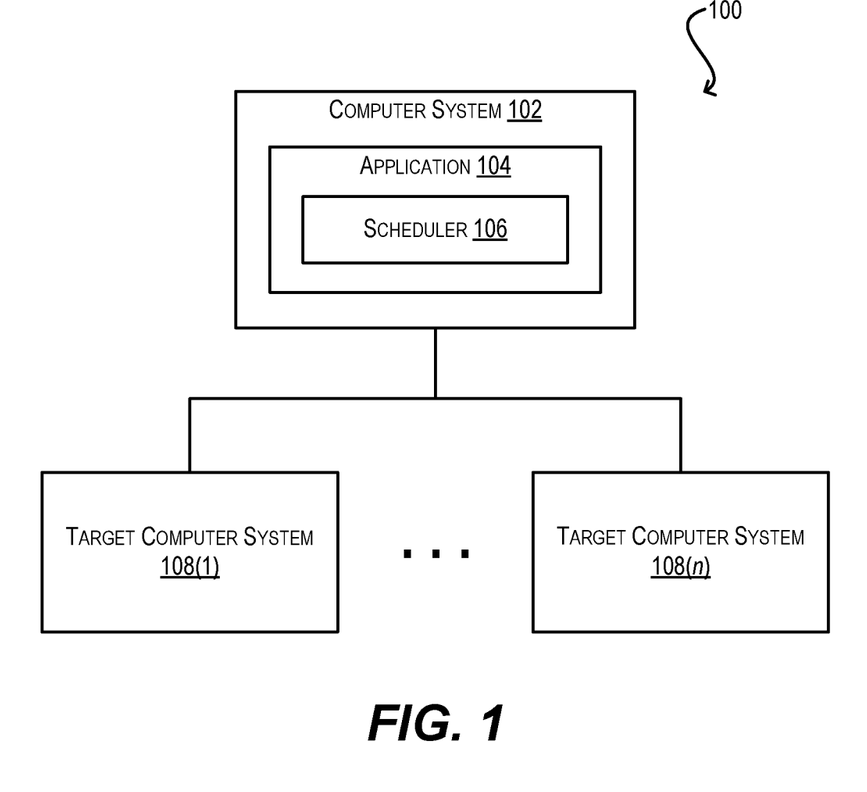
FIG. 1 depicts an example computing environment according to certain embodiments.

FIG. 1 is a simplified block diagram of an example computing environment 100 in which the algorithm of the present disclosure may be implemented. As shown, computing environment 100 includes a computer system 102 comprising an application 104 and a scheduler 106 that is communicatively coupled with a number of target computer systems 108(1)-(n). Application 104 is configured to execute an instance of a periodic workload (i.e., a workload with a cycle length of c) against each of a subset R of target computer systems 108(1)-(n) with the understanding that the size of subset R, and thus the number of periodic workload instances executed by application 104, may change at runtime. The size of subset R/number of periodic workload instances is denoted by m. For example, in a particular embodiment application 104 may be a Software-as-a-Service (SaaS) billing application that samples the SaaS platform usage of each target computer system 108 in subset R every c minutes for billing purposes. In this embodiment, m may dynamically change as customers join (i.e., subscribe to) and leave (i.e., unsubscribe from) the SaaS platform.

Given the dynamic nature of m, the goal of scheduler 106 of application 104 is to create and maintain a globally uniform-in-time execution schedule for the application's periodic workload instances that automatically adjusts to changes in m during the application's runtime. The maintenance of such a globally uniform schedule provides a number of important benefits. For example, in scenarios where computing environment 100 is susceptible to transient environmental issues (e.g., network outages, system crashes, etc.), distributing the execution start times of the periodic workload instances in a globally uniform-in-time manner decreases the likelihood that multiple workload instances will be affected by a given transient issue. Further, in scenarios where computer system 102 has limited system resources (e.g., compute, memory, network/storage bandwidth, etc.), a globally uniform-in-time execution schedule reduces the instantaneous resource usage of application 104 by minimizing the number of concurrently running workload instances, which in turn reduces the likelihood that any workload instance will experience poor performance due to exceeding the system's resource limits.

In cases where m is predetermined, a globally uniform-in-time execution schedule can be easily created by assigning execution start times to the periodic workload instances in a round-robin order, with adjacent execution start times being separated by a uniform time interval t equal to c (cycle length) divided by m. This value for t is optimal in the sense that it maximizes the temporal distance between adjacent execution start times while ensuring that the per-instance constraint of requiring c units of time between consecutive start times for the same periodic workload instance is not violated.

Figure 2:
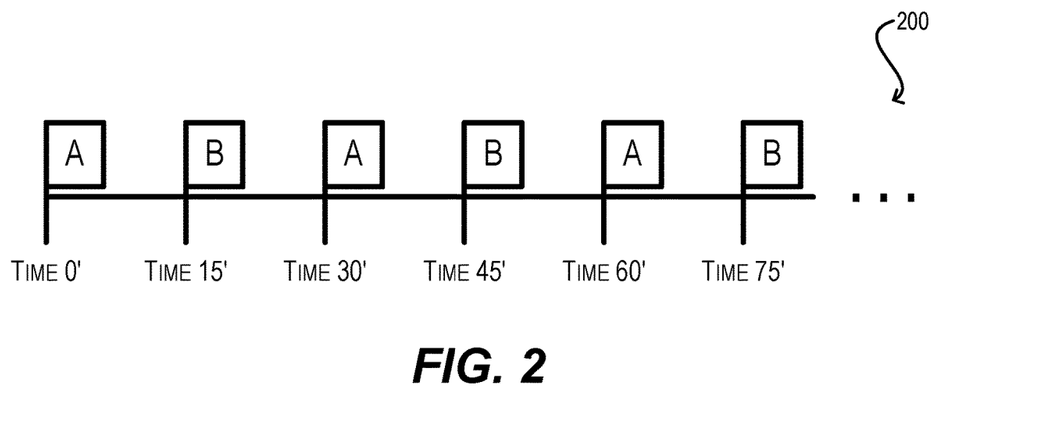
FIG. 2 depicts an example globally-uniform-in-time execution schedule.

By way of example, FIG. 2 depicts a globally uniform-in-time execution schedule 200 for an example scenario in which m is fixed at 2 (resulting in two periodic workload instances A and B) and c equals 30 minutes. As shown in schedule 200, the execution start times of A and B respectively are uniformly spaced 30 minutes apart (e.g., times 0', 30', 60', etc. for A and times 15', 45', 75', etc. for B), which is consistent with the cycle length of 30 minutes. In addition, every pair of adjacent execution start times (e.g., [A at 0', B at 15'], [B at 15', A at 30'], [A at 30', B at 45'], etc.) are uniformly spaced 30/2=15 minutes apart, resulting in global uniformity between the execution start times of all workload instances.

However, in cases where m may change at runtime, simply creating an initial globally uniform-in-time execution schedule is not sufficient. Instead, this schedule must be corrected/adjusted as periodic workload instances are added and removed in order to ensure that the time intervals between adjacent execution start times remain uniform. It is possible to implement this correction/adjustment by recreating the entire schedule from scratch in response to every batch of workload instance addition(s)/removal(s). However, this solution is inefficient and can occasionally lead to undesirable scheduling irregularities. For instance, if application 104 of FIG. 1 is a SaaS billing application as mentioned previously, recreating the schedule from scratch for every workload instance addition or removal event may inadvertently delay a particular execution of a workload instance beyond its intended cycle, resulting in a missed SaaS usage sample and thus inability to correctly bill the customer corresponding to that instance.

Figure 3:
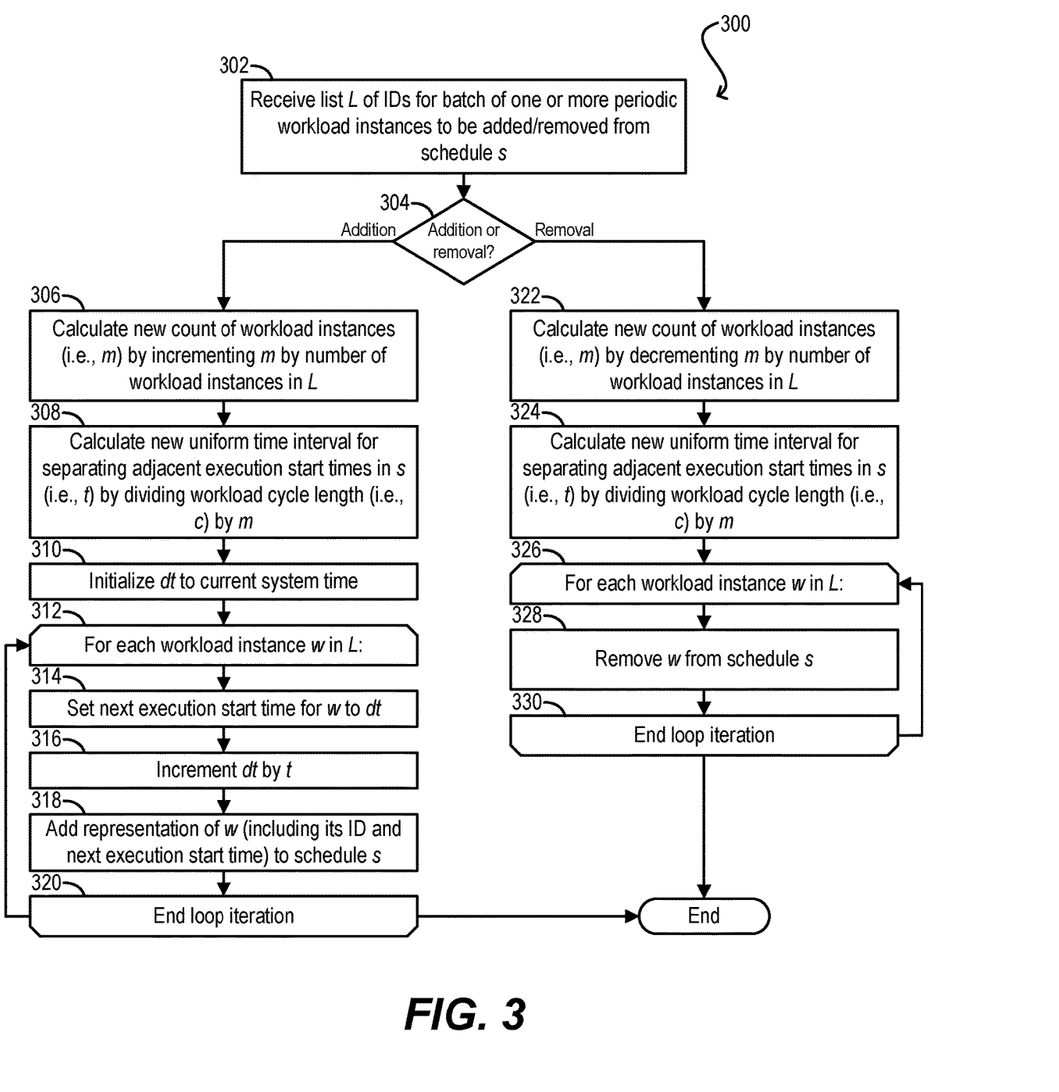
FIGS. 3 and 4 depict workflows for implementing a globally uniform-in-time scheduling algorithm according to certain embodiments.
Figure 4:
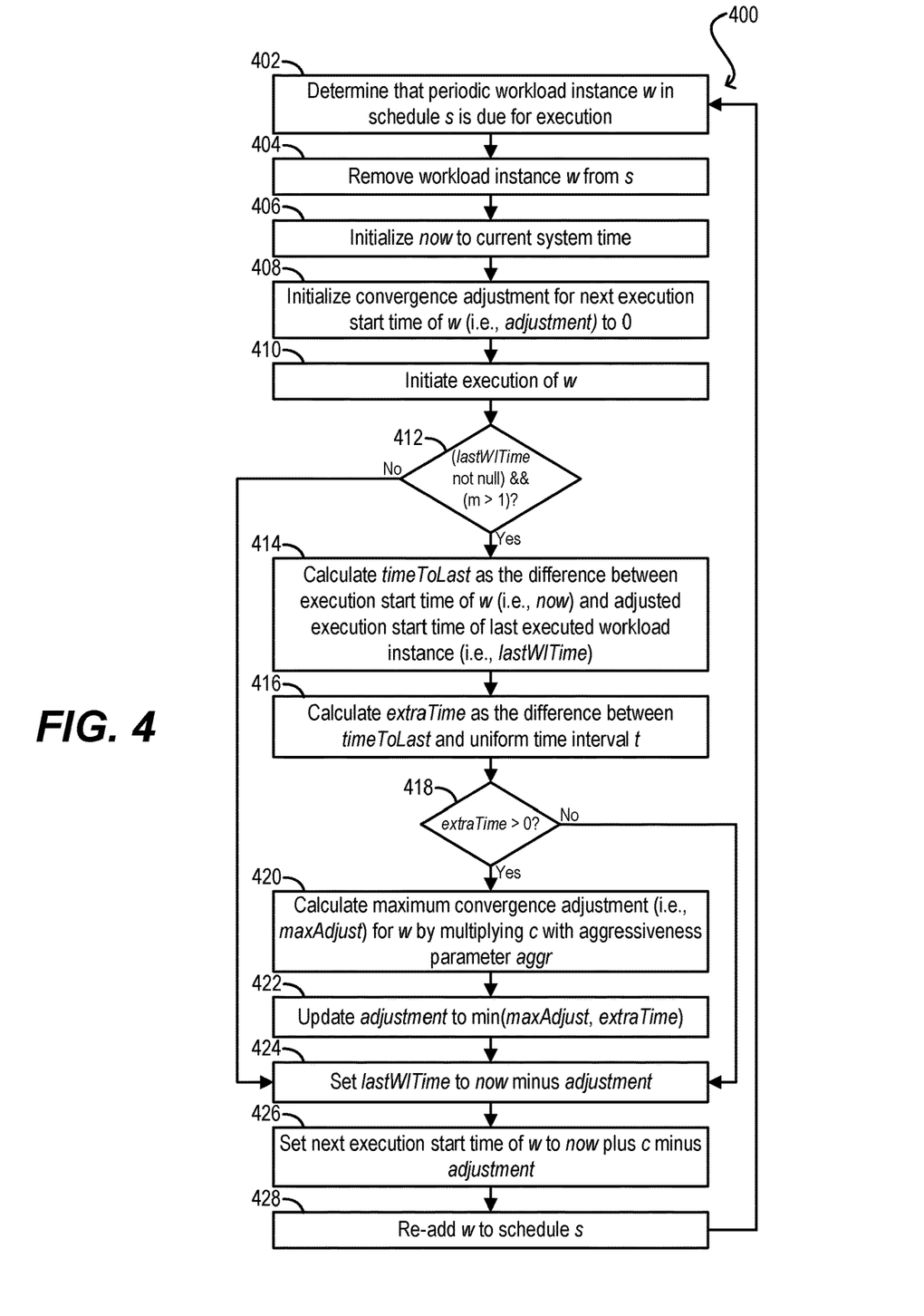

To address the foregoing and other similar problems, FIGS. 3 and 4 depict a novel algorithm that can be implemented by scheduler 106 of FIG. 1 for efficiently maintaining a globally uniform-in-time execution schedule, referred to as schedule s, for application 104's m periodic workload instances in the face of dynamic changes to m. In particular, FIG. 3 depicts a workflow 300 of the algorithm that adds a batch of new periodic workload instances or removes a batch of existing periodic workload instances to/from schedule s, and FIG. 4 depicts a workflow 400 of the algorithm that handles a periodic workload instance in s that is due for execution and calculates its next execution start time. Generally speaking, workflows 300 and 400 enable scheduler 106 to gradually adjust, in response to workload instance additions or removals, the execution start times in schedule s so that they converge to a globally uniform state. In various embodiments, these workflows can be executed concurrently (e.g., via different threads) by scheduler 106.

Starting with block 302 of workflow 300, scheduler 106 can receive a list L of identifiers (IDs) for a batch of one or more periodic workload instances to be added to or removed from the current version of schedule s. If list L identifies periodic workload instances to be added (block 304), scheduler 106 can calculate a new count of workload instances in schedule s (i.e., m) by incrementing m by the number of workload instances in L (block 306), calculate a new uniform time interval for separating adjacent execution start times in s (i.e., t) by dividing cycle length c by m (block 308), and initialize a variable dt to the current system time (block 310).

In addition, at block 312, scheduler 106 can enter a loop for each periodic workload instance w in list L. Within this loop, scheduler 106 can set the next execution start time for workload instance w to dt (block 314), increment dt by t (block 316), and add a representation of workload instance w (including its ID and next execution start time) to schedule s (block 318). Scheduler 106 can then reach the end of the loop iteration (block 320) and repeat blocks 312-320 for further workload instances in list L. In this way, scheduler 106 can schedule the first workload instance in L for immediate execution and schedule the executions of any remaining workload instances in L such that they are spaced apart according to newly-calculated uniform time interval t. In certain embodiments, at the conclusion of this loop, an explicit notification can be generated to inform the thread of scheduler 106 which performs workflow 400 that a new workload has been added (and thus should be processed in accordance with workflow 400).

Returning to decision block 304, if list L identifies workload instances to be removed rather than added, scheduler 106 can calculate a new value for m by decrementing m by the number of workload instances in L (block 322) and a new value for uniform time interval t by dividing cycle length c by m (block 324). Scheduler 106 can thereafter enter a loop for each periodic workload instance w in list L (block 326), remove workload instance w from schedule s (block 328), reach the end of the loop iteration (block 330), and repeat blocks 326-330 further workload instances in L.

Turning now to workflow 400 of FIG. 4, starting with block 402, scheduler 106 can determine that a periodic workload instance w in schedule s is due for execution per its next execution start time. In response, scheduler 106 can remove workload instance w from schedule s (block 404), initialize a variable now to the current system time (block 406), and initialize a variable adjustment to 0 (block 408). As explained below, adjustment will be used to hold the "convergence adjustment" that should applied to the next execution start time for workload instance w in the scenario where the temporal distance between the current execution time of w (as represented by now) and the adjusted execution time of the last executed workload instance $w_{last}$ in schedule s (as represented by a variable lastWITime) exceeds uniform time interval t.

Upon initializing the now and adjustment variables, scheduler 106 can initiate execution of workload instance w such that it is run by a separate, asynchronous process or thread of application 104 (block 410). Scheduler 106 can then check whether lastWITime is not null (i.e., whether workload instance w is not the first instance to be executed with respect to schedule s) and whether m (i.e., the number of workload instances in s) is greater than 1 (block 412).

If the answer at block 412 is yes, scheduler 106 can calculate a value timeToLast indicating the amount of time that has passed between the execution start time of workload instance w (i.e., now) and the adjusted execution start time of the last executed workload instance $w_{last}$ (i.e., lastWITime) (block 414). lastWITime represents an "adjusted" execution start time for $w_{last}$ in the sense that lastWITime reflects the convergence adjustment calculated for $w_{last}$ (i.e., adjustment) in the previous iteration of workflow 400 (and will be updated to reflect the convergence adjustment computed for w in the current iteration of workflow 400 at block 424 below). This application of the convergence adjustment to lastWITime is key in ensuring that all execution start times in schedule s quickly converge to a globally uniform state.

Scheduler 106 can further calculate a value extraTime indicating the difference between timeToLast and uniform time interval t (block 416) and check whether extraTime is greater than 0 (block 418). If the answer at block 418 is yes, scheduler 106 can conclude that the next execution start time for workload instance w should be adjusted (because the current execution of w was later than optimal) and calculate a maximum convergence adjustment (i.e., maxAdjust) by multiplying cycle length c by a tunable aggressiveness parameter aggr (block 420). In various embodiments, aggressiveness parameter aggr can be set within a range of 0 to 1. Scheduler 106 can then update convergence adjustment variable adjustment to the minimum of either maxAdjust or extraTime (block 422). In this way, scheduler 106 can determine an appropriate convergence adjustment to be applied to the next execution start time for workload instance w so that is separated t units of time from the previous workload instance in schedule s, but can "clip" the convergence adjustment by a degree that is influenced by the aggressiveness parameter.

Upon completing the foregoing, scheduler 106 can set lastWITime to now minus adjustment, thereby recording the execution start time of current workload instance w for use in the next iteration of workflow 400, as modified by the calculated convergence adjustment (block 424). As mentioned above, the application of adjustment to lastWITime (rather than simply using the actual execution start time of w) enables the quick convergence property of this algorithm.

Finally, at blocks 426 and 428, scheduler 106 can set the next execution start time of workload instance w to occur after cycle length c with the convergence adjustment applied (i.e., now+c−adjustment) and can re-add workload instance w with its next execution start time to schedule s. Scheduler 106 can thereafter repeat blocks 402-428 as further workload instances become due for execution in schedule s.

With the high-level algorithm embodied in workflows 300 and 400, a number of advantages are realized. First, the algorithm is efficient because (1) it does not require schedule s to be recreated upon each periodic workload instance addition/removal event, and (2) it will rapidly converge to a globally uniform state, per its quick convergence property, regardless of the number of workload instances added or removed. For example, under most circumstances the algorithm with converge within a single cycle length c, subject to the value of the aggressiveness parameter. In terms of space and time complexity, the algorithm requires only $O(m)$ storage or memory to hold schedule s and can run in $O(\log m)$ time (assuming s is implemented using a priority queue or other similar data structure).

Second, because the algorithm operates by adjusting the execution start times in schedule s backwards in time (and never forward in time) in order to reach a globally uniform state, it ensures that the per-instance constraint of requiring a given periodic workload instance to execute "at least once every c units of time" is never violated.

Third, when multiple periodic workload instances are added as a batch, the algorithm preserves their relative order in schedule s due to the logic in workflow 300. This behavior is beneficial for certain applications that may rely on this ordering to be maintained.

It should be appreciated that FIGS. 1-3 and the foregoing description are illustrative and not intended to limit embodiments of the present disclosure. For example, although FIG. 1 assumes that the targets of the workload instances executed by application 104 of computer system 102 are other computer systems 108(1)-(n), in alternative embodiments the workload instance targets may be other software applications, potentially running on the same system as application 104, or data objects/files. Further, although FIG. 1 depicts a particular arrangement of entities and components within computing environment 100, other arrangements are possible (e.g., the functionality attributed to a particular entity/component may be split into multiple entities/components, entities/components may be combined, etc.). One of ordinary skill in the art will recognize other variations, modifications, and alternatives.

3. Example Pseudocode Implementation

Listing 1 below is an example pseudocode implementation of the algorithm of the present disclosure in a Java-like language. In this implementation, the addWorkloads and removeWorkloads methods are largely similar in function to workflow 300 of FIG. 3 and the runScheduler method is largely similar in function to workflow 400 of FIG. 4. The remaining methods are implementation helpers used by addWorkloads, removeWorkloads, and runScheduler.

It should be appreciated that Listing 1 includes certain implementation details that are not required by the high-level algorithm presented in FIGS. 3 and 4. For example, the runScheduler method makes use of a blocking wait operation to determine when to process the next "due" workload instance in the workloads data structure (i.e., schedule s), but other techniques for implementing this general functionality (such as, e.g., non-blocking asynchronous methods/timers) may be employed.

```
// tunable parameters - should be initialized at start
Duration cycleLen;
float aggr;
// private state
PriorityQueue<Workload> workloads =
    new PriorityQueue(/* Comparator comparing Workload::dueTime */);
HashMap<String, Workload> id2wl = new HashMap< >( );
Duration optimalSeparation = null;    // the temporal separation between two adjacent workloads
                                      // that would ensure a globally uniform schedule
                                      // (updated every time the number of workloads change)
Instant lastWITime = null; // the *adjusted* timestamp of the start of the last workload
Condition workload_added = new Condition( ); // a "new workload added" signal
class Workload {
Workload(String id) {
   this.id = id;
}
final String id;
Instant dueTime;
}
// public flows
// A. Accepting a batch of new workloads
```

```
// First, the new value of optimalSeparation is calculated.
// Then, the new workloads are added to the schedule with the first workload
// scheduled for immediate execution and subsequent workloads scheduled to be uniformly spaced
// (according to the newly calculated optimalSeparation)
public void addWorkloads(String[ ] ids) {
   int newWlCount = workloads.size( ) + ids.length;
   optimalSeparation = cycleLen / newWlCount;
   Instant dt = now( );
   for(String id : ids) {
      Workload wl = new Workload(id);
      wl.dueTime = dt;
      dt = dt + optimalSeparation;
      workloads.add(wl);
      id2wl.put(id, wl);
   }
   workload_added.notify( );
}
// B. Removing a batch of workloads from the schedule
// First, the new value of optimalSeparation is calculated.
// Then, the workloads are marked as removed/invalid in the workload state store.
public void removeWorkloads(String[ ] ids) {
   int newWlCount = workloads.size( ) − ids.length;
   optimalSeparation = cycleLen / newWlCount;
   for(String id : ids) {
      id2wl.get(id).dueTime = null;
      id2wl.remove(id);
   }
}
// C. Main scheduler loop - runs infinitely
public void runScheduler( ) {
   while(true) {
      // 1. Wait until the due time of the next workload or until a new workload is added
      Instant nextWlTick = getNextWorkloadDueTime( );
      wait_for(sys_timestamp(nextWlTick), workload_added)
      // 2. Remove the workload from the state store. If the workload has been marked as
      // deleted/invalid
      // restart the main loop from the top.
      Workload wl = workloads.poll( );
      If (wl.dueTime == null) {
         continue;
      }
      Instant now = now( );
      Duration adjustment = 0;        // adjustment to be applied to the repeat period of the current
                                      // workload
      // 3. Kick-off the execution of the workload
      scheduleWorkload(wl.id);
      // 4. Calculate the adjustment to be applied to the repeat period of the current workload
      // so that it will converge to a globally uniform schedule
      // Do this if:
      // - this is not the first workload to ever execute
      // - there's currently more than one workload
      if (lastWlTime != null && workloads.size( ) > 1) {
         // 4.1. Calculate the time that passed between the start of the current workload
         // and the *adjusted* start time of the last workload
         Duration timeToLast = now − lastWlTime;
         Duration extraTime = timeToLast − optimalSeparation;
         // 4.2. If it is more then the current value of optimalSeparation
         // (i.e. the time spacing needed for a globally uniform schedule) calculate an adjustment
         // that will move the start time of the next execution of the *current* workload so that is
         // exactly optimalSeparation separated from the next execution of the *previous* workload.
         // However, clip the adjustment as directed by the aggressiveness parameter
         If (extraTime > 0) {
            Duration maxAdjust = cycleLen * aggr;
            adjustment = Math.min(maxAdjust, extraTime);
         }
      }
      // 5. Store the start time of the execution of the current workload but with the adjustment
      // that will happen to its next execution already applied.
      // (this step allows for quick converging behavior)
      lastWlTime = now − adjustment;
      // 6. Set the next execution of the current workload to start after the requested repeat
      // period with the convergence adjustment calculated above also applied.
      wl.dueTime = now + cycleLen − adjustment;
      // 7. Add the workload back to the state store.
      workloads.add(wl);
   }
}
   // application-specific overridable
void scheduleWorkload(String id) {
```

```
// triggers the execution of the workload with the specified id
// it is assumed execution itself will occur asynchronously, that is
// without blocking the main scheduler loop
}
// implementation helpers
Instant getNextWorkloadDueTime( ) {
   while(true) {
     if(workloads.isEmpty( )) {
        wait_for(workload_added)
     } else {
        Workload wl = workloads.peek( )
        if(wl.dueTime != null) {
        return wl.dueTime;
        }
     }
   }
}
void wait_for(Condition... conds) {
// blocks until any of the specified conditions becomes signaled
// before returning, the method sets the signaled condition back to a non-signaled state
}
Condition sys_timestamp(Instant ts) {
// returns a Condition that becomes signaled once the system clock reaches (or is past)
// the specified time instant
}
Instant now( ) {
// returns the current system clock
}
```

Listing 1

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a generic computer system comprising one or more general purpose processors (e.g., Intel or AMD x86 processors) selectively activated or configured by program code stored in the computer system. In particular, various generic computer systems may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any storage device, based on any existing or subsequently developed technology, that can store data and/or computer programs in a non-transitory state for access by a computer system. Examples of non-transitory computer readable media include a hard drive, network attached storage (NAS), read-only memory, random-access memory, flash-based nonvolatile memory (e.g., a flash memory card or a solid state disk), persistent memory, NVMe device, a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations, and equivalents can be employed without departing from the scope hereof as defined by the claims.

What is claimed is:

1. A method comprising:
   determining, by a computer system, that a first periodic workload instance in a schedule is due for execution, the first periodic workload instance being an instance of a periodic workload associated with a cycle length, the schedule including execution start times for one or more instances of the periodic workload;

initiating, by the computer system, execution of the first periodic workload instance;

determining, by the computer system, a convergence adjustment for a next execution start time for the first periodic workload instance, the convergence adjustment indicating an adjustment to be made to the next execution start time and being based on a time differential between a last execution start time associated with the schedule and a time of the execution of a first workload instance;

setting, by the computer system, the next execution start time to the time of the execution of the first workload instance plus the cycle length minus the convergence adjustment;

updating, by the computer system, the last execution start time associated with the schedule to the time of the execution of the first workload instance minus the convergence adjustment; and adding, by the computer system, the next execution start time to the schedule.

2. The method of claim 1 wherein determining the convergence adjustment comprises:

calculating an optimal interval between schedule execution times as the cycle length divided by a count of periodic workload instances included in the schedule; and calculating an extra time parameter as a difference between the time differential and the optimal interval.

3. The method of claim 2 wherein determining the convergence adjustment further comprises, if the extra time parameter is greater than zero:

setting a maximum convergence adjustment to the cycle length multiplied with an aggressiveness value; and setting the convergence adjustment to a minimum of the maximum convergence adjustment and the extra time parameter.

4. The method of claim 3 wherein the aggressiveness value is a value between zero and one.

5. The method of claim 1 further comprising:

receiving a request to schedule execution of a second periodic workload instance, the second periodic workload instance also being an instance of the periodic workload;

incrementing a count of periodic workload instances included in the schedule by one;

calculating an optimal interval between schedule execution times as the cycle length divided by the count;

setting a next execution start time for the second periodic workload instance to a current system time; and adding the next execution start time for the second periodic workload instance to the schedule.

6. The method of claim 5 further comprising:

determining, based on the schedule, that the second periodic workload instance is due for execution;

initiating, by the computer system, execution of the second periodic workload instance;

determining, by the computer system, another convergence adjustment for a next execution start time for the second periodic workload instance, said another convergence adjustment being based on another time differential between the last execution start time associated with the schedule and a time of the execution of the second workload instance;

setting the next execution start time for the second periodic workload instance to the time of the execution of the second workload instance plus the cycle length minus said another convergence adjustment;

updating the last execution start time associated with the schedule to the time of the execution of the second workload instance minus said another convergence adjustment; and adding the next execution start time for the second periodic workload instance to the schedule.

7. The method of claim 1 further comprising:

receiving a request to cancel execution of the first periodic workload instance;

decrementing a count of periodic workload instances included in the schedule by one;

calculating an optimal interval between schedule execution times based on the decremented count; and removing all execution times for the first periodic workload instance from the schedule.

8. A non-transitory computer readable storage medium having stored thereon program code executable by a computer system, the program code embodying a method comprising:

determining that a first periodic workload instance in a schedule is due for execution, the first periodic workload instance being an instance of a periodic workload associated with a cycle length, the schedule including execution start times for one or more instances of the periodic workload;

initiating execution of the first periodic workload instance;

determining a convergence adjustment for a next execution start time for the first periodic workload instance, the convergence adjustment indicating an adjustment to be made to the next execution start time and being based on a time differential between a last execution start time associated with the schedule and a time of the execution of a first workload instance;

setting the next execution start time to the time of the execution of the first workload instance plus the cycle length minus the convergence adjustment;

updating the last execution start time associated with the schedule to the time of the execution of the first workload instance minus the convergence adjustment; and adding the next execution start time to the schedule.

9. The non-transitory computer readable storage medium of claim 8 wherein determining the convergence adjustment comprises:

calculating an optimal interval between schedule execution times as the cycle length divided by a count of periodic workload instances included in the schedule; and calculating an extra time parameter as a difference between the time differential and the optimal interval.

10. The non-transitory computer readable storage medium of claim 9 wherein determining the convergence adjustment further comprises, if the extra time parameter is greater than zero:

setting a maximum convergence adjustment to the cycle length multiplied with an aggressiveness value; and setting the convergence adjustment to a minimum of the maximum convergence adjustment and the extra time parameter.

11. The non-transitory computer readable storage medium of claim 10 wherein the aggressiveness value is a value between zero and one.

12. The non-transitory computer readable storage medium of claim 8 wherein the method further comprises:

receiving a request to schedule execution of a second periodic workload instance, the second periodic workload instance also being an instance of the periodic workload;

incrementing a count of periodic workload instances included in the schedule by one;

calculating an optimal interval between schedule execution times as the cycle length divided by the count;

setting a next execution start time for the second periodic workload instance to a current system time; and adding the next execution start time for the second periodic workload instance to the schedule.

13. The non-transitory computer readable storage medium of claim 12 wherein the method further comprises:

determining, based on the schedule, that the second periodic workload instance is due for execution;

initiating, by the computer system, execution of the second periodic workload instance;

determining, by the computer system, another convergence adjustment for a next execution start time for the second periodic workload instance, said another convergence adjustment being based on another time differential between the last execution start time associated with the schedule and a time of the execution of the second workload instance;

setting the next execution start time for the second periodic workload instance to the time of the execution of the second workload instance plus the cycle length minus said another convergence adjustment;

updating the last execution start time associated with the schedule to the time of the execution of the second workload instance minus said another convergence adjustment; and adding the next execution start time for the second periodic workload instance to the schedule.

14. The non-transitory computer readable storage medium of claim 8 wherein the method further comprises:

receiving a request to cancel execution of the first periodic workload instance;

decrementing a count of periodic workload instances included in the schedule by one;

calculating an optimal interval between schedule execution times based on the decremented count; and removing all execution times for the first periodic workload instance from the schedule.

15. A computer system comprising:

a processor; and a non-transitory computer readable medium having stored thereon program code that, when executed, causes the processor to:

determine that a first periodic workload instance in a schedule is due for execution, the first periodic workload instance being an instance of a periodic workload associated with a cycle length, the schedule including execution start times for one or more instances of the periodic workload;

initiate execution of the first periodic workload instance;

determine a convergence adjustment for a next execution start time for the first periodic workload instance, the convergence adjustment indicating an adjustment to be made to the next execution start time and being based on a time differential between a last execution start time associated with the schedule and a time of the execution of a first workload instance;

set the next execution start time to the time of the execution of the first workload instance plus the cycle length minus the convergence adjustment;

update the last execution start time associated with the schedule to the time of the execution of the first workload instance minus the convergence adjustment; and add the next execution start time to the schedule.

16. The computer system of claim 15 wherein the program code that causes the processor to determine the convergence adjustment comprises code that causes the processor to:

calculate an optimal interval between schedule execution times as the cycle length divided by a count of periodic workload instances included in the schedule; and calculate an extra time parameter as a difference between the time differential and the optimal interval.

17. The computer system of claim 16 wherein the program code that causes the processor to determine the convergence adjustment further comprises code that causes the processor to, if the extra time parameter is greater than zero:

set a maximum convergence adjustment to the cycle length multiplied with an aggressiveness value; and set the convergence adjustment to a minimum of the maximum convergence adjustment and the extra time parameter.

18. The computer system of claim 17 wherein the aggressiveness value is a value between zero and one.

19. The computer system of claim 15 wherein the program code further causes the processor to:

receive a request to schedule execution of a second periodic workload instance, the second periodic workload instance also being an instance of the periodic workload;

increment a count of periodic workload instances included in the schedule by one;

calculate an optimal interval between schedule execution times as the cycle length divided by the count;

set a next execution start time for the second periodic workload instance to a current system time; and add the next execution start time for the second periodic workload instance to the schedule.

20. The computer system of claim 19 wherein the program code further causes the processor to:

determine, based on the schedule, that the second periodic workload instance is due for execution;

initiate, by the computer system, execution of the second periodic workload instance;

determine, by the computer system, another convergence adjustment for a next execution start time for the second periodic workload instance, said another convergence adjustment being based on another time differential between the last execution start time associated with the schedule and a time of the execution of the second workload instance;

set the next execution start time for the second periodic workload instance to the time of the execution of the second workload instance plus the cycle length minus said another convergence adjustment;

update the last execution start time associated with the schedule to the time of the execution of the second workload instance minus said another convergence adjustment; and add the next execution start time for the second periodic workload instance to the schedule.

21. The computer system of claim 15 wherein the program code further causes the processor to:

receive a request to cancel execution of the first periodic workload instance;

decrement a count of periodic workload instances included in the schedule by one;

calculate an optimal interval between schedule execution times based on the decremented count; and remove all execution times for the first periodic workload instance from the schedule.

\* \* \* \* \*